(12) United States Patent
Mezzino et al.

(10) Patent No.: US 11,187,339 B2
(45) Date of Patent: Nov. 30, 2021

(54) PRESSURE RELIEF VALVE

(71) Applicant: Microtecnica S.r.l., Turin (IT)

(72) Inventors: Giacomo Mezzino, Turin (IT);
Domenico Tafuni, Turin (IT); Andrea Mornacchi, Turin (IT)

(73) Assignee: MICROTECNICA S.R.L, Turin (IT)

( * ) Notice: Subject to any disclaimer, the term of this patent is extended or adjusted under 35 U.S.C. 154(b) by 49 days.

(21) Appl. No.: 16/711,786

(22) Filed: Dec. 12, 2019

(65) Prior Publication Data
US 2020/0378511 A1 Dec. 3, 2020

(30) Foreign Application Priority Data

May 29, 2019 (EP) ..................... 19177394

(51) Int. Cl.
*F16K 17/168* (2006.01)
*G05D 16/10* (2006.01)

(52) U.S. Cl.
CPC ......... *F16K 17/168* (2013.01); *G05D 16/103* (2013.01)

(58) Field of Classification Search
CPC ...... F16K 17/02; F16K 17/065; F16K 17/168; G05D 16/103
USPC ........................... 137/505.11, 505.13–505.15
See application file for complete search history.

(56) References Cited

U.S. PATENT DOCUMENTS

| | | | |
|---|---|---|---|
| 3,286,725 | A | 11/1966 | Elbogen et al. |
| 4,552,330 | A | 11/1985 | Grotloh |
| 6,178,997 | B1 | 1/2001 | Adams et al. |
| 6,955,113 | B2 | 10/2005 | Demers |
| 9,841,039 | B2 | 12/2017 | Adams et al. |
| 2009/0248210 | A1 | 10/2009 | Arenas |
| 2013/0180607 | A1 | 7/2013 | Graspeuntner |
| 2017/0220055 | A1 | 8/2017 | Quaglia et al. |

FOREIGN PATENT DOCUMENTS

DE        2013681 A1    10/1971

OTHER PUBLICATIONS

Extended European Search Report for International Application No. 19177394.4 dated Nov. 11, 2019, 12 pages.

*Primary Examiner* — Paul J Gray
(74) *Attorney, Agent, or Firm* — Cantor Colburn LLP

(57) ABSTRACT

A pressure relief valve includes a first port that receives a first gas at an input pressure, a second port that receive a second gas at a regulating pressure, a third port in communication with the first port via an orifice and that outputs the first gas at an output pressure and a piston movable along an axis and configured to control the passage of gas through the orifice between the first port and the second port, such that the output pressure of the gas is dependent on the axial position of the piston. The valve also in include a resilient member configured to bias the piston and the valve comprises a chamber at least partly defined by the piston and in fluid communication with the second port, such that the force exerted by the gas within the chamber on the piston acts against the action of the resilient member.

12 Claims, 4 Drawing Sheets

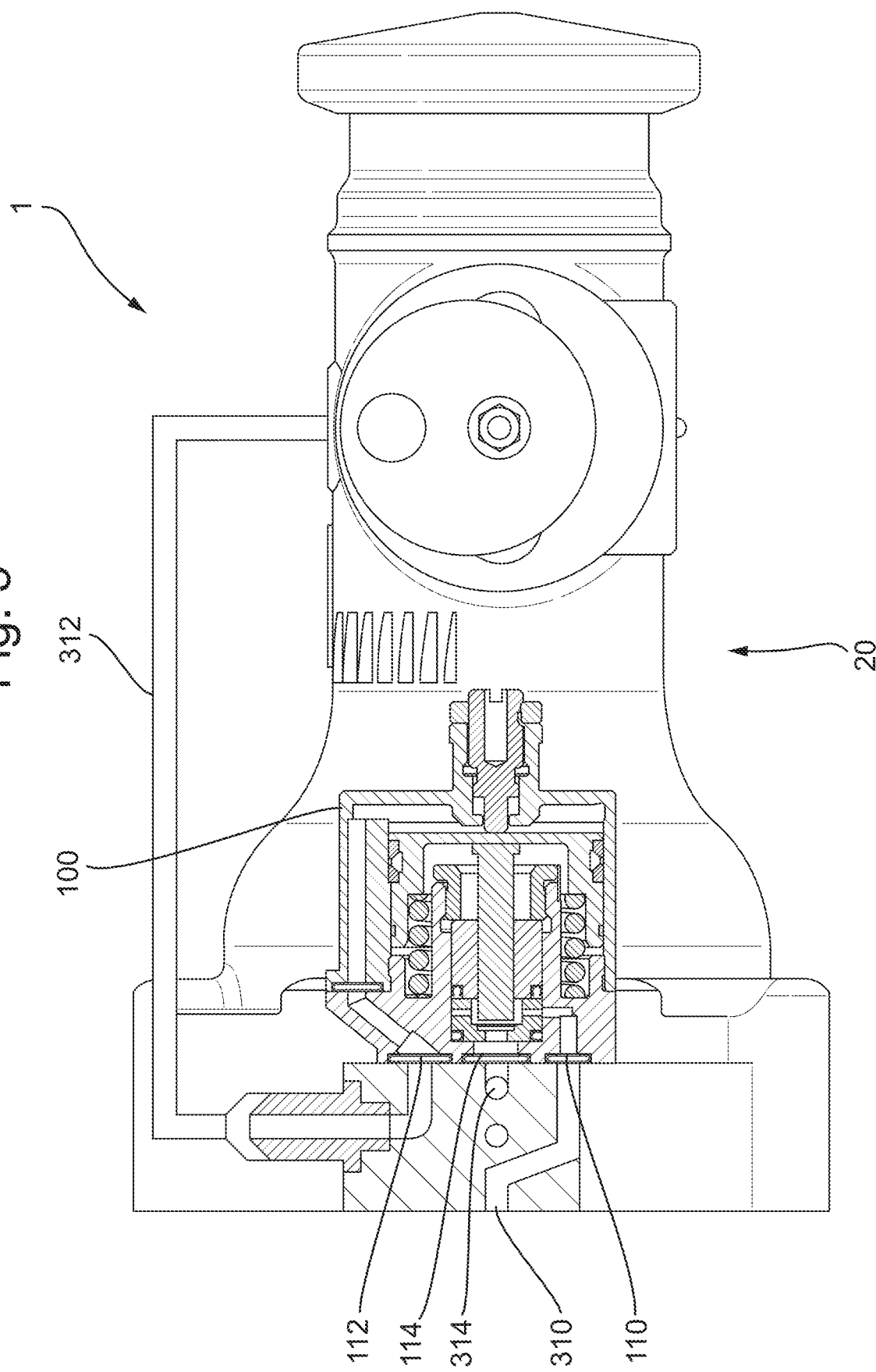

PRESSURE RELIEF VALVE

FOREIGN PRIORITY

This application claims priority to European Patent Application No. 19177394.4 filed May 29, 2019, the entire contents of which is incorporated herein by reference.

FIELD

The present disclosure relates generally to a pressure relief valve for a pressure regulator.

BACKGROUND

A pressure relief valve is a safety feature that is configured to open automatically when the pressure of a system or environment exceeds a specified amount. In this situation, the pressure relief valve opens, which releases air and reduces the pressure of the system. Once the pressure falls below the specified amount the relief valve closes and the pressure levels return back to normal. It can be provided as a safety mechanism to prevent any adverse effects in high-pressure environments.

A pressure regulator may be used to match a flow of gas through the regulator to the demand for gas placed upon it, whilst maintaining a constant output pressure. If the load flow decreases, then the regulator flow must decrease as well. If the load flow increases, then the regulator flow must increase in order to keep the controlled pressure from decreasing due to a shortage of gas in the pressure system.

A pressure regulator typically includes a restricting element, a loading element, and a measuring element. The restricting element may be a valve that can provide a variable restriction to the flow, such as a globe valve, butterfly valve, poppet valve, etc. The loading element may be a part that can apply the needed force to the restricting element. This loading can be provided by a weight, a spring, a piston actuator, or the diaphragm actuator in combination with a spring. The measuring element may function to determine when the inlet flow is equal to the outlet flow. Various types of pressure regulator are known in the art and will not be described in detail herein.

Relief valves have been incorporated as part of a system including a pressure regulator. FIGS. 1 and 2 show (schematically) an example in which an input 10 leads to an output 12 through a pressure regulator 20. The output 12 may lead to a component to be supplied with pressurised air from the pressure regulator 20.

The pressure regulator 20 may be configured to regulate the pressure of gas (e.g., air) being passed from the input 10 to the output 12. The pressure regulator 20 may also be configured to stop the flow of gas from the input 10 to the output 12, as indicated by the flow circuit diagram in FIG. 1.

A relief valve 30 may be fluidly connected to the pressure regulator 20 and/or the gas line passing from the input 10 to the output 12. The relief valve 30 is configured to release gas from, and reduce the pressure of the gas within the pressure regulator 20 when the pressure of the gas within the pressure regulator 20 (or otherwise passing from the input 10 to the output 12) exceeds a specified amount.

That is, when the pressure of the gas within the pressure regulator 20 (or otherwise passing from the input 10 to the output 12) exceeds the specified amount, the pressure relief valve 30 moves to its open position and vents gas to an external environment as indicated at arrow 32. It should be noted that the pressure relief valve 30 is shown in its closed position in FIG. 1.

The relief valve 30 may be configured to regulate the pressure within a chamber C of the pressure regulator 20 and prevent excessive build-up of pressure within the chamber.

It is desired to improve the function of a relief valve when provided in combination with a pressure regulator.

SUMMARY

In a first aspect there is provided a pressure relief valve comprising a first port, a second port and a third port. The first port is configured to receive a first gas at an input pressure, the second port is configured to receive a second gas at a regulating pressure (which may be different from the input pressure), and the third port is in fluid communication with the first port via an orifice, and is configured to output the first gas at an output pressure. The valve further comprises a piston movable along an axis and configured to control the passage of gas through the orifice between the first port and the second port, such that the output pressure of the gas is dependent on the axial position of the piston. The valve further comprises a resilient member configured to bias the piston, wherein the valve comprises a chamber at least partly defined by the piston and in fluid communication with the second port, such that the force exerted by the gas within the chamber on the piston acts against the action of the resilient member.

The above arrangement provides an improved pressure relief valve that is able to use the resilient member and piston to control the passage of gas through the orifice, based on the pressure of gas within the chamber.

The piston may be configured to move between a fully open position, in which a maximum flow of gas is permitted through the orifice, and a closed position, in which substantially no gas is permitted to flow through the orifice.

The resilient member may be configured to bias the piston towards its open position.

The force exerted by the gas within the chamber on the piston may bias the piston towards its open position.

A pin may be operatively connected to the piston and may be configured to move along the axis with the piston, such that movement of the piston causes a corresponding movement of the pin.

The orifice may comprise a gap between the pin and a fixed housing of the valve, and movement of the pin along the axis causes the gap to become larger and smaller.

The pressure relief valve may further comprise a device configured to set and/or regulate the stroke of the piston.

The device may comprise a pin configured to contact the piston, wherein the axial position of the pin sets the axial position of the piston.

The resilient member may be configured to bias the piston against the pin.

The pin may comprise a screw thread, and may be movable along the axis by rotating the pin so as to move the pin along the screw thread.

In an aspect there is provided a system comprising a pressure relief valve as described above, wherein the system further comprises a pressure regulator, and the pressure relief valve is configured to release gas from, and/or reduce the pressure of the gas within the pressure regulator.

The pressure regulator may comprise a chamber, and the gas pressure within the chamber may be configured to control or otherwise influence a position of one of the operative components of the pressure regulator, wherein the third port is in fluid communication with the chamber of the pressure regulator.

The operative component of the pressure regulator may be configured to vary an output pressure of the pressure regulator.

The operative component of the pressure regulator may be a regulating piston.

In an aspect there is provided a method of operating a pressure relief valve (e.g., a pressure relief valve described above, which may or may not form part of a system as described above), the method comprising: receiving a first gas into a first port of the valve at an input pressure; receiving a second gas into a second port of the valve at a regulating pressure; outputting the first gas at an output pressure through a third port, wherein the third port is in fluid communication with the first port via an orifice; moving a piston along an axis and to control the passage of gas through the orifice between the first port and the second port, wherein the output pressure of the gas is dependent on the axial position of the piston; and biasing the piston using a resilient member. In this method the valve comprises a chamber at least partly defined by the piston and in fluid communication with the second port, such that the force exerted by the gas within the chamber on the piston acts against the action of the resilient member.

BRIEF DESCRIPTION OF THE DRAWINGS

Various embodiments will now be described, by way of example only, and with reference to the accompanying drawings in which:

FIG. 5 shows an external view of a portion of the system of FIG. 3, with a cross-section through the pressure relief valve (which corresponds to that of FIG. 4).

DETAILED DESCRIPTION

Herewith will be described various embodiments of a pressure relief valve that may be used in combination with a pressure regulator (or other suitable device).

Figure 1:
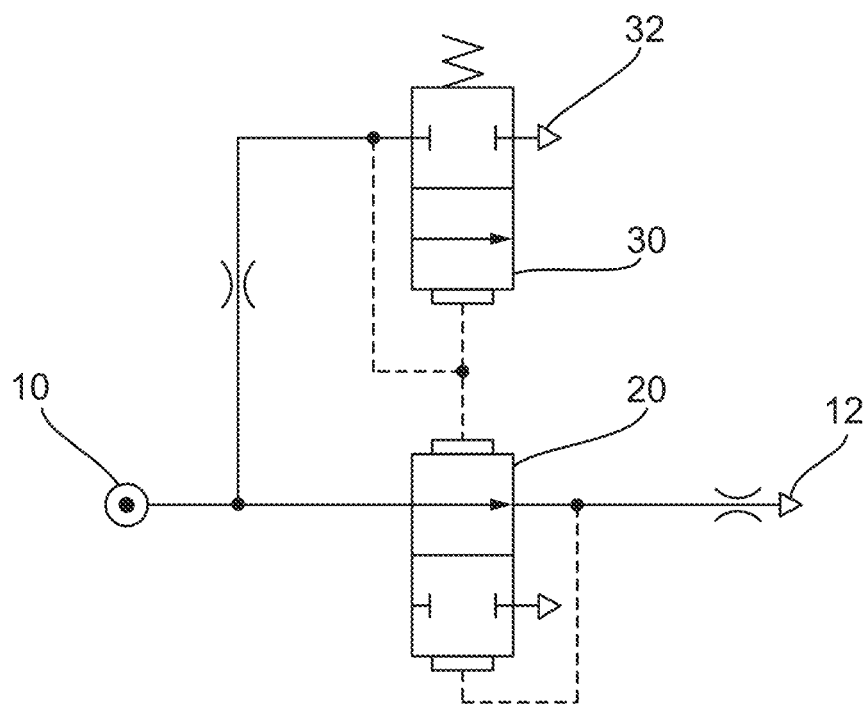
FIGS. 1 and 2 show an example in which an input leads to an output through a pressure regulator.
Figure 2:
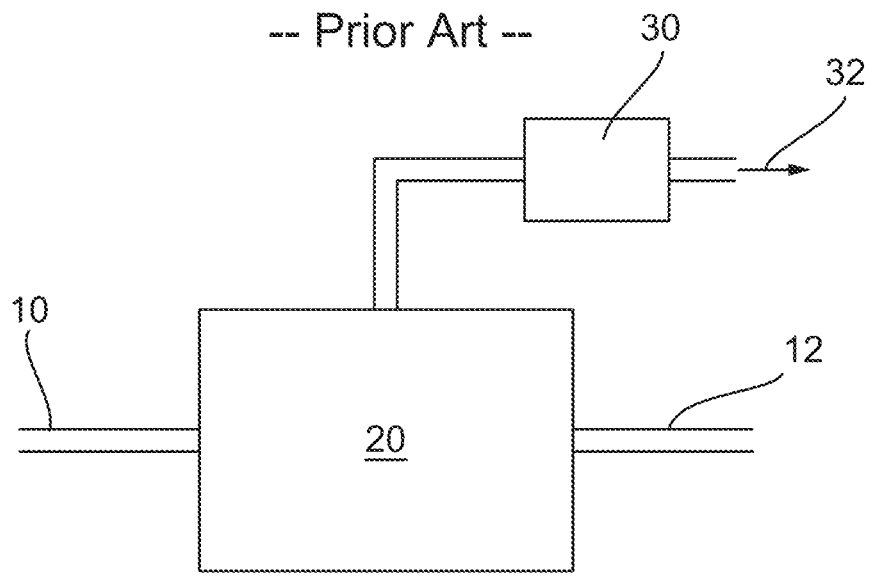
Figure 3:
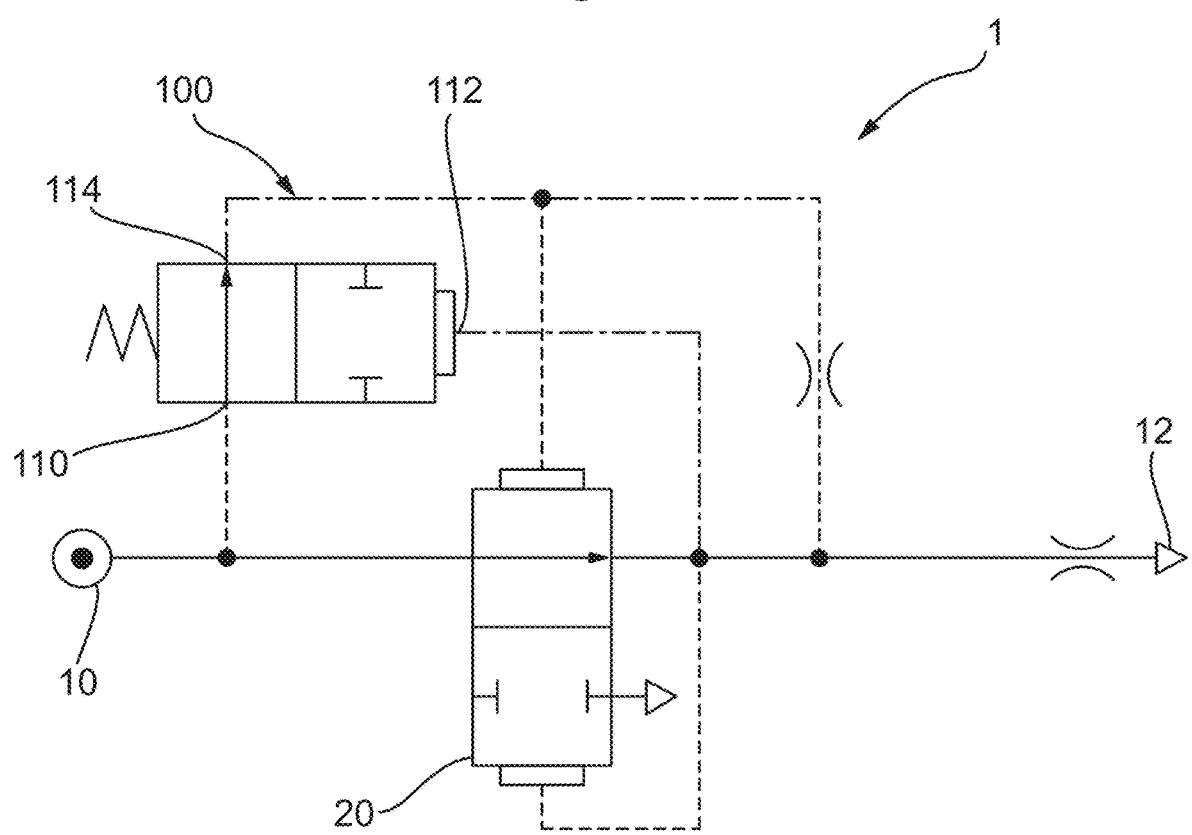
FIG. 3 shows a system according to an embodiment of the present disclosure.

FIG. 3 schematically shows a system 1 according to an embodiment of the present disclosure. As will be appreciated, the position of the pressure regulator 20 between the input 10 and the output 12 is largely unchanged from that shown above in respect of FIGS. 1-2. However, the arrangement of the pressure relief valve is changed, and a new pressure relief valve 100 is provided.

Figure 4:
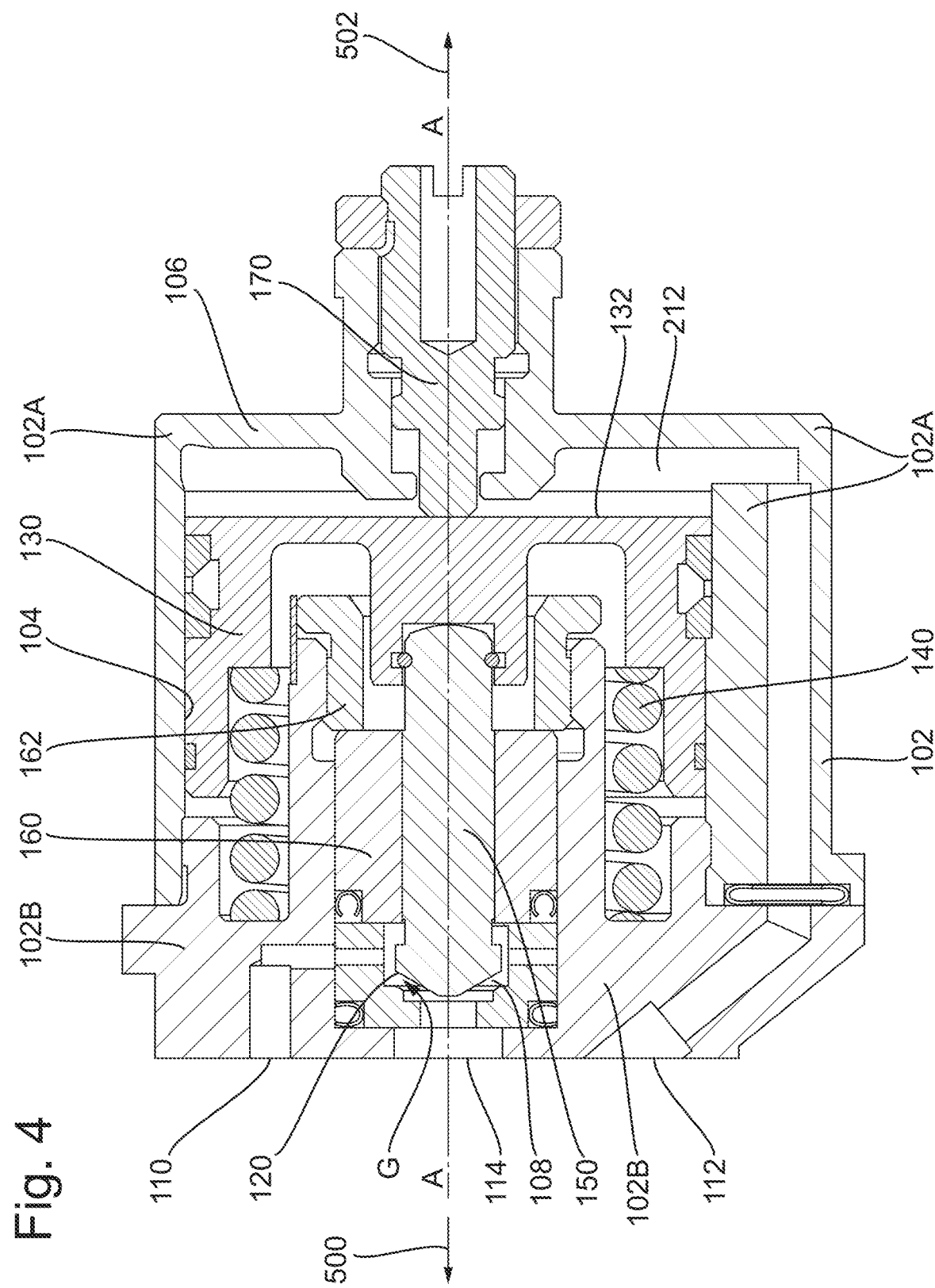
FIG. 4 shows a pressure relief valve according to an embodiment.

FIG. 4 shows the pressure relief valve 100 according to an embodiment.

The pressure relief valve 100 comprises a housing 102 having a first port 110, a second port 112 and a third port 114. The housing 102 may comprise a first part 102A and a second part 102B, wherein the first part 102A and the second part 102B combine to provide the substantially fixed portion of the pressure relief valve 100. In various embodiments the second part 102B may plug into the first part 102A to form the housing 102. Other arrangements are possible to connect the first and second parts 102A and 102B, or in other embodiments the housing 102 could be formed by a single piece.

The first port 110 may be exposed to gas from the input 10 so that the pressure of gas entering the first port 110 may be at the input pressure of the system 1.

The second port 112 may be exposed to gas from the pressure regulator 20, and specifically from the downstream end of the pressure regulator 20 (or adjacent the output of the pressure regulator 20), so that the pressure of gas entering the second port 112 may be at the output pressure of the system 1.

The third port 114 is fluidly connectable to the first port 110 via a piloted orifice 120, wherein in use gas may pass from the first port 110 to the third port 114 when the orifice 120 is in an open position. As described in more detail below, the orifice 120 may be closed, or open to varying degrees in order to provide a regulating function for the gas flowing between the first port 110 and the third port 114.

The third port 114 is fluidly connected to the pressure regulator 20, and in accordance with various embodiments with a chamber of the pressure regulator 20, wherein the pressure within the chamber controls a position of one of the operative components of the pressure regulator (e.g., a regulating piston), which can vary the output pressure of the pressure regulator.

One example of a pressure regulator employing a regulating piston can be found in United States Patent Application No. 2017/0220055, which pressure regulator would be suitable as the pressure regulator 20. However, any suitable pressure regulator could be used that employs or otherwise requires a relief valve.

The pressure relief valve 100 further comprises a piston 130 that is movable within an internal (e.g., cylindrical) cavity 104 of the housing 102, e.g., the first part 102A thereof, wherein the piston 130 is configured to move back and forth along an axis A. A resilient member 140 (e.g., a spring) may be located between the housing 102, e.g., the second part 102B thereof and the piston 130, and is configured to bias the piston 130 in an axial direction (see arrow 502).

The pressure relief valve 100 further comprises a pin 150 that is operatively connected to the piston 130 and is configured to move along the axis A with the piston 130, such that movement of the piston 130 causes a corresponding movement of the pin 150.

In various embodiments the pin 150 may comprise the same part as the piston 130, although in the illustrated embodiment is shown as a separate piece. The pin 150 may be slidably received within a bushing 160, which bushing 160 may be fixedly attached to the housing 102, e.g., the second part 102B thereof. The bushing 160 may be fixedly attached within the second part 102B of the housing 102 in this manner using a suitable fixing member 162.

The pin 150 is movable along the axis A between an open position (a fully open position is shown in FIG. 4) and a closed position.

In the open position the pin 120 does not block the passage of gas through the orifice 120 (e.g., between the first port 110 and the third port 114), for example in this position gas may pass through a gap G defined in the orifice 120 between the pin 150 and a rim 108 of the housing 102.

In the closed position the pin 120 closes the orifice 120, e.g., by substantially blocking the passage of gas between the first port 110 and the third port 114, for example the pin 150 may contact a rim 108 of the housing 102 and close the gap G.

The first port 110 is configured to receive a gas at an input pressure, and the third port 114, which is in fluid communication with the first port 110 via the orifice 120, is configured to output the gas at an output pressure. The piston 130 is movable along the axis A and is configured to control the passage of gas through the orifice 120 between the first port 110 and the third port 114, such that the axial position of the piston 130 changes the output pressure of the gas.

The second port 112 of the pressure relief valve 100 fluidly communicates with a chamber 212 that may be located adjacent a base 106 of the housing 102. The chamber 212 is at least partially defined by a surface 132 of the piston 130, for example a base surface of the piston 130. The surface 132 is configured so that pressurised air acting on the surface 132 will create a force that opposes the action of the resilient member 140, such that an increase in gas pressure within the chamber 212 causes an increase in the force opposing the action of the resilient member 140.

It will be appreciated that the gas pressure within the chamber 212 corresponds directly to the pressure of the gas entering the second port 112, and as such may correspond to the pressure of gas from the pressure regulator 20, and specifically from the downstream end of the pressure regulator 20 (or adjacent the output of the pressure regulator 20), so that the pressure of gas entering the second port 112 and the chamber 212 may be at the output pressure of the system 1.

In other words, the output pressure of the system 1 may act against the action of the resilient member 140 and (above a certain level) cause the piston 130 to move against the action of the resilient member 140 (in the direction of arrow 500). This, in turn, causes the pin 150 to move in the same direction and towards a position in which it closes the orifice 120. Should the output pressure of the system 1 be high enough, therefore, the pin 150 will be moved into its closed position so as to close the orifice 120.

The arrangement described above provides a feedback mechanism, wherein the output pressure of the system 1 is used to regulate the displacement of the pin 150 within the pressure relief valve 100, and in turn regulate the passage of gas through the pressure relief valve 100 between the input (corresponding to the first port 110) and the output (corresponding to the third port 114). This effectively provides a feedback signal that can be used to optimise the pressure regulation of the pressure regulator.

The pressure relief valve 100 may further comprise a device configured to set and/or regulate the stroke of the piston 130, otherwise referred to as the preload of the resilient member 140. This is shown in FIG. 4 as a regulating pin 170 (e.g., a screw) that is configured to contact the piston 130 (e.g., the surface 132 thereof) and move along the axis A, wherein the axial position of the regulating pin 170 sets the axial position of the piston 130. In other words, the resilient member 140 biases the piston 130 against the regulating pin 170. The axial position of the pin 170 may be modified by moving it along the axis A, and this may be achieved by providing a screw thread between the regulating pin 170 and a portion of the housing 102 (or other fixed component).

In various embodiments, the regulating pin 170 may be replaced by spacers, for example positioned between the resilient member 140 and the housing 102 or the piston 130, which would have the same function as the regulating pin 170. However, using a regulating pin 170, and specifically one incorporating a screw thread, provides the optimum amount of control of the stroke of the piston 130, or preload of the resilient member 140.

FIG. 5 shows an external view of a portion of the system 1, with a cross-section through the pressure relief valve 100. An input duct 310 is shown that fluidly connects the first port 110 with gas received from the input 10 (and prior to its entry into the pressure regulator 20). In addition, a feedback duct 312 fluidly connects the second port 112 with an output of the pressure regulator 20, and a reference duct 314 is fluidly connected to the third port 114 as well. As discussed above the gas flowing through reference duct 314 may flow to a chamber of the pressure regulator 20, wherein the pressure within the chamber controls a position of one of the operative components of the pressure regulator (e.g., a regulating piston), which can vary the output pressure of the pressure regulator.

Although the present disclosure has been described with reference to various embodiments, it will be understood by those skilled in the art that various changes in form and detail may be made without departing from the scope of the invention as set forth in the accompanying claims.

The invention claimed is:

1. A system comprising:
   an input (10);
   an output (12);
   a pressure regulator (20); and
   a pressure relief valve comprising:
      a first port configured to receive a first gas at an input pressure;
      a second port configured to receive a second gas at a regulating pressure;
      a third port in fluid communication with the first port via an orifice and configured to output the first gas at an output pressure;
      a piston movable along an axis and configured to control the passage of the first gas through the orifice between the first port and the third port, such that the output pressure of the first gas is dependent on the axial position of the piston; and
      a resilient member configured to bias the piston,
      wherein the pressure relief valve comprises a chamber at least partly defined by the piston and in fluid communication with the second port, such that the force exerted by the second gas within the chamber on the piston acts against the action of the resilient member;
   wherein the first port is configured to receive the first gas from the input so that the pressure of the first gas entering the first port is at the input pressure of the system;
   wherein the second port is configured to receive the second gas from a downstream end of the pressure regulator, so that the pressure of the second gas entering the second port is at the output pressure of the system;
   wherein the pressure relief valve is configured to reduce the pressure of the gas within the pressure regulator; and
   wherein the pressure regulator comprises a chamber, and a gas pressure within the chamber is configured to control or otherwise influence a position of one of the operative components of the pressure regulator, wherein the third port is in fluid communication with the chamber of the pressure regulator.

2. The system as claimed in claim 1, wherein the piston is configured to move between a fully open position, in which a maximum flow of gas is permitted through the orifice, and a closed position, in which no gas is permitted to flow through the orifice.

3. The system as claimed in claim 2, wherein the resilient member is configured to bias the piston towards the fully open position.

4. The system as claimed in claim 2, wherein the force exerted by the second gas within the chamber on the piston biases the piston towards the closed position.

5. The system as claimed in claim 1, wherein a pin is operatively connected to the piston and is configured to move along the axis with the piston, such that movement of the piston causes a corresponding movement of the pin.

6. The system as claimed in claim 5, wherein the orifice comprises a gap between the pin and a fixed housing of the valve, and movement of the pin along the axis causes the gap to become larger and smaller.

7. The system as claimed in claim 1, further comprising a device configured to set and/or regulate the stroke of the piston.

8. The system as claimed in claim 7, wherein the device comprises a regulating pin configured to contact the piston, wherein the axial position of the regulating pin sets the axial position of the piston.

9. The system as claimed in claim 8, wherein the resilient member is configured to bias the piston against the regulating pin.

10. The system as claimed in claim 8, wherein the regulating pin comprises a screw thread, and is movable along the axis by rotating the regulating pin so as to move the regulating pin along the screw thread.

11. The system as claimed in claim 1, wherein the operative component of the pressure regulator is configured to vary an output pressure of the pressure regulator.

12. The system as claimed in claim 1, wherein the operative component of the pressure regulator is a regulating piston.

* * * * *